United States Patent
McCarty, Jr.

(10) Patent No.: US 8,485,676 B2
(45) Date of Patent: Jul. 16, 2013

(54) DUAL VIEW MIRROR SYSTEM

(76) Inventor: Donald William McCarty, Jr., Bunker Hill, WV (US)

( * ) Notice: Subject to any disclaimer, the term of this patent is extended or adjusted under 35 U.S.C. 154(b) by 648 days.

(21) Appl. No.: 12/659,238

(22) Filed: Mar. 2, 2010

(65) Prior Publication Data

US 2011/0216427 A1 Sep. 8, 2011

(51) Int. Cl.
*G02B 5/08* (2006.01)
*G02B 7/182* (2006.01)

(52) U.S. Cl.
USPC ............................. 359/855; 359/865; 248/479

(58) Field of Classification Search
USPC .................................... 359/855, 865; 248/479
See application file for complete search history.

(56) References Cited

U.S. PATENT DOCUMENTS

| | | | |
|---|---|---|---|
| 369,114 A | 8/1887 | Knapp | |
| 717,611 A | 1/1903 | Painter | |
| 1,024,506 A | 4/1912 | Graham | |
| 1,509,746 A | 9/1924 | Zeidler | |
| 4,487,479 A | 12/1984 | Tolomeo, Sr. | |
| 5,383,061 A | 1/1995 | Lanier | |
| 5,400,183 A | 3/1995 | Rosser | |
| 5,604,633 A | 2/1997 | Christianson | |
| 5,943,175 A | 8/1999 | LaViola | |
| 6,220,717 B1 | 4/2001 | Pastore | |
| 6,588,440 B2 | 7/2003 | Varnado | |
| 7,063,427 B1 | 6/2006 | Cutler | |
| 8,157,394 B1 * | 4/2012 | Downing | 359/868 |
| 2004/0125477 A1 | 7/2004 | Carter | |
| 2004/0233556 A1 * | 11/2004 | LaViola | 359/872 |
| 2007/0035863 A1 * | 2/2007 | Rogers | 359/850 |

OTHER PUBLICATIONS

"In-sight Hunting Mirror," accessed on-line at http://insighthuntingmirror.com/ on Jan. 9, 2010, 1 page.
"The DeerView Mirror," accessed on-line at http://deerviewmirror.com/the_deerviewmirror.html on Jan. 9, 2010, 1 page.

* cited by examiner

*Primary Examiner* — Alessandro Amari
(74) *Attorney, Agent, or Firm* — Clifford D. Crowder

(57) ABSTRACT

Apparatus for increasing a person's field of view is disclosed. The apparatus includes a mounting base. A receiver is rotatably mounted to the mounting base. A center arm section including a plurality of rigid segments is adjustably mounted at one end to the receiver. The apparatus also includes an upper arm section. A ball and socket connection is included between the upper arm section and the center arm section. The apparatus also includes a plurality of mirrors mounted on the upper arm section.

13 Claims, 9 Drawing Sheets

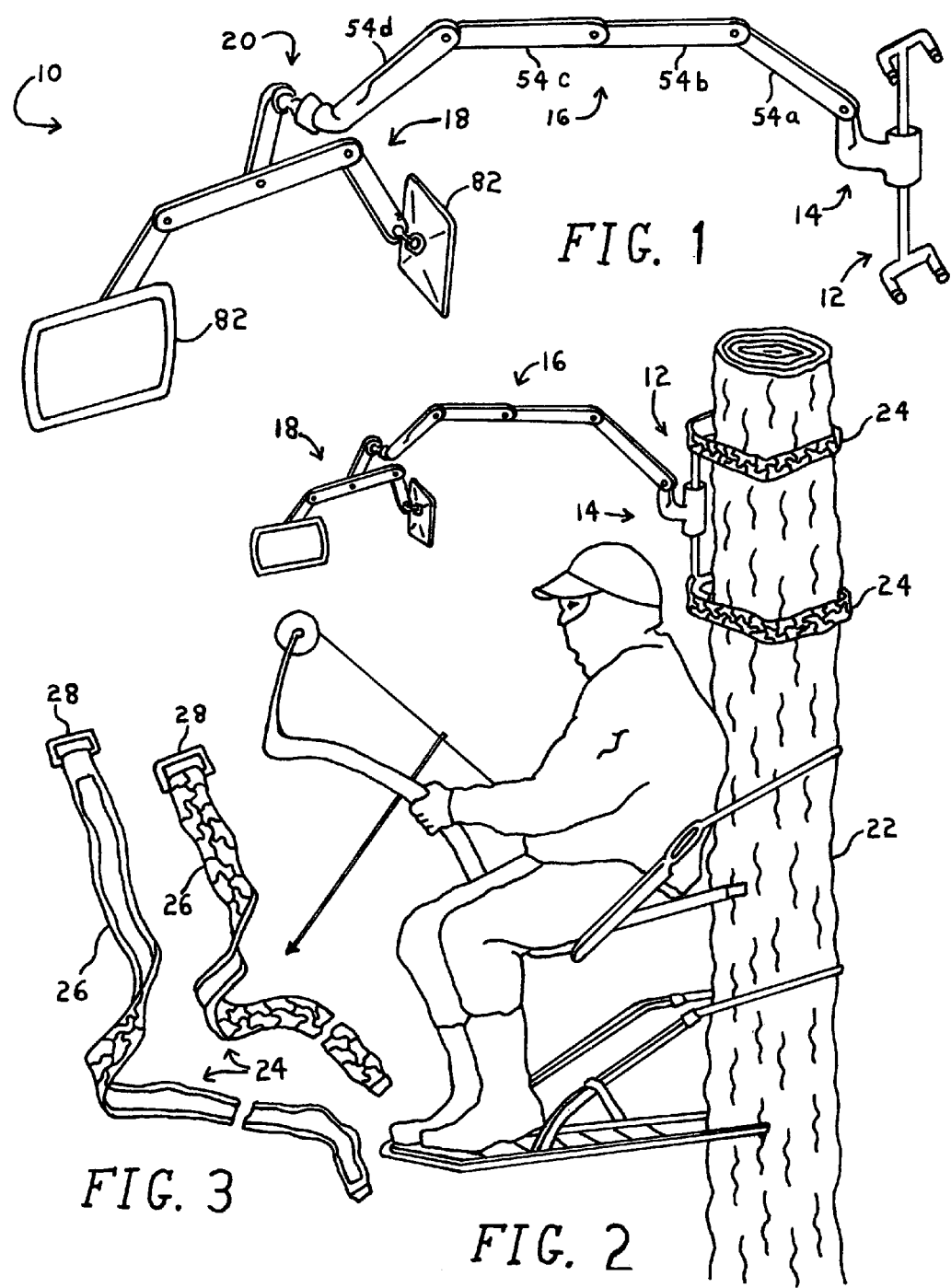

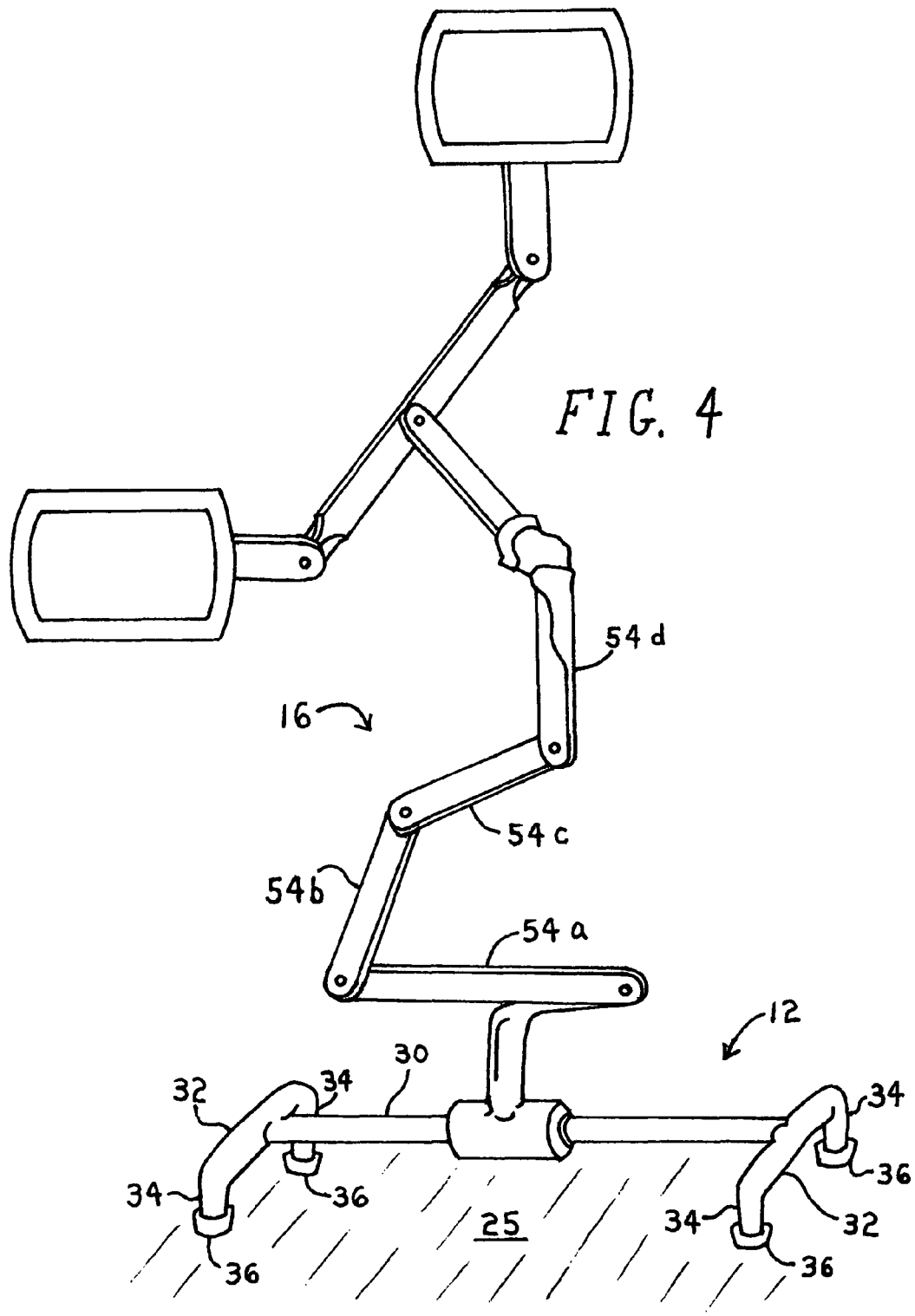

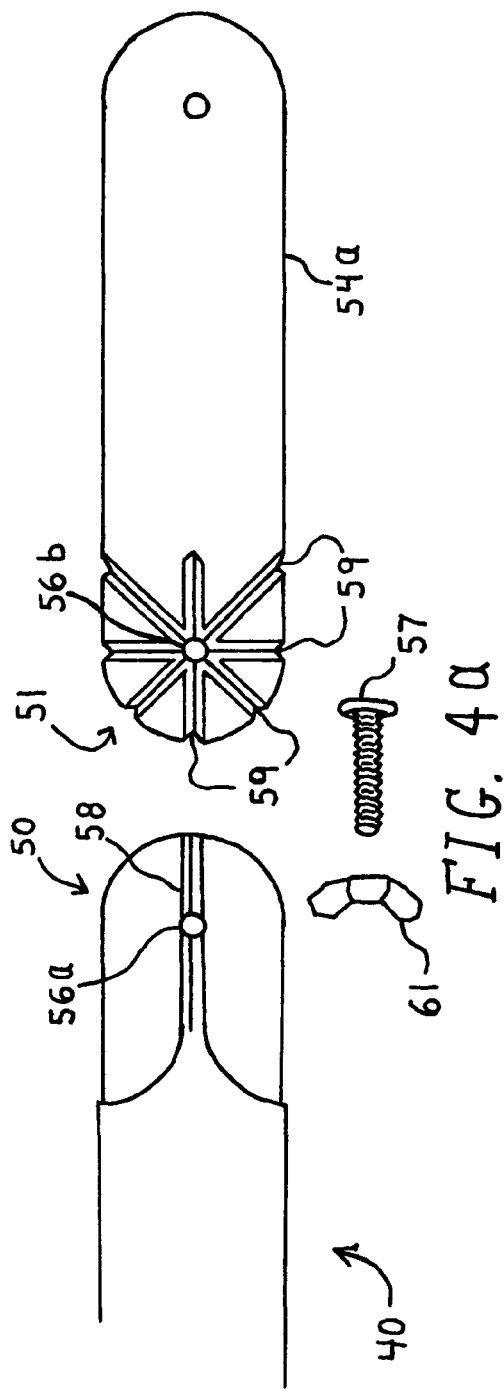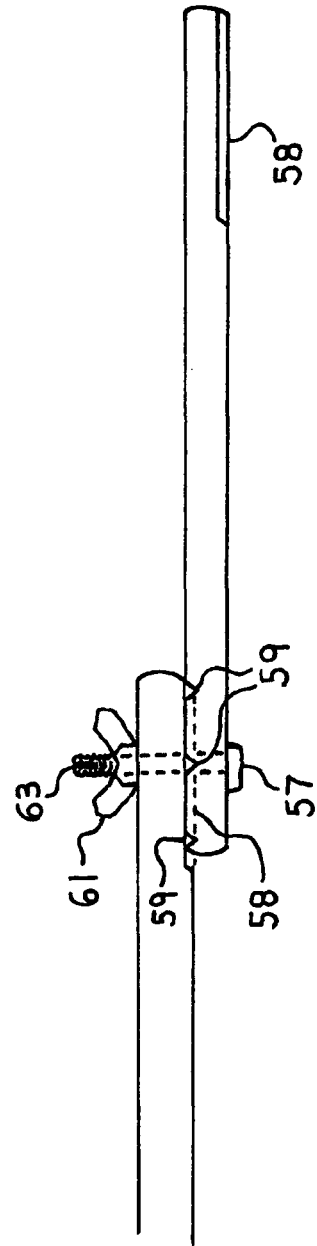
FIG. 4a
FIG. 4b

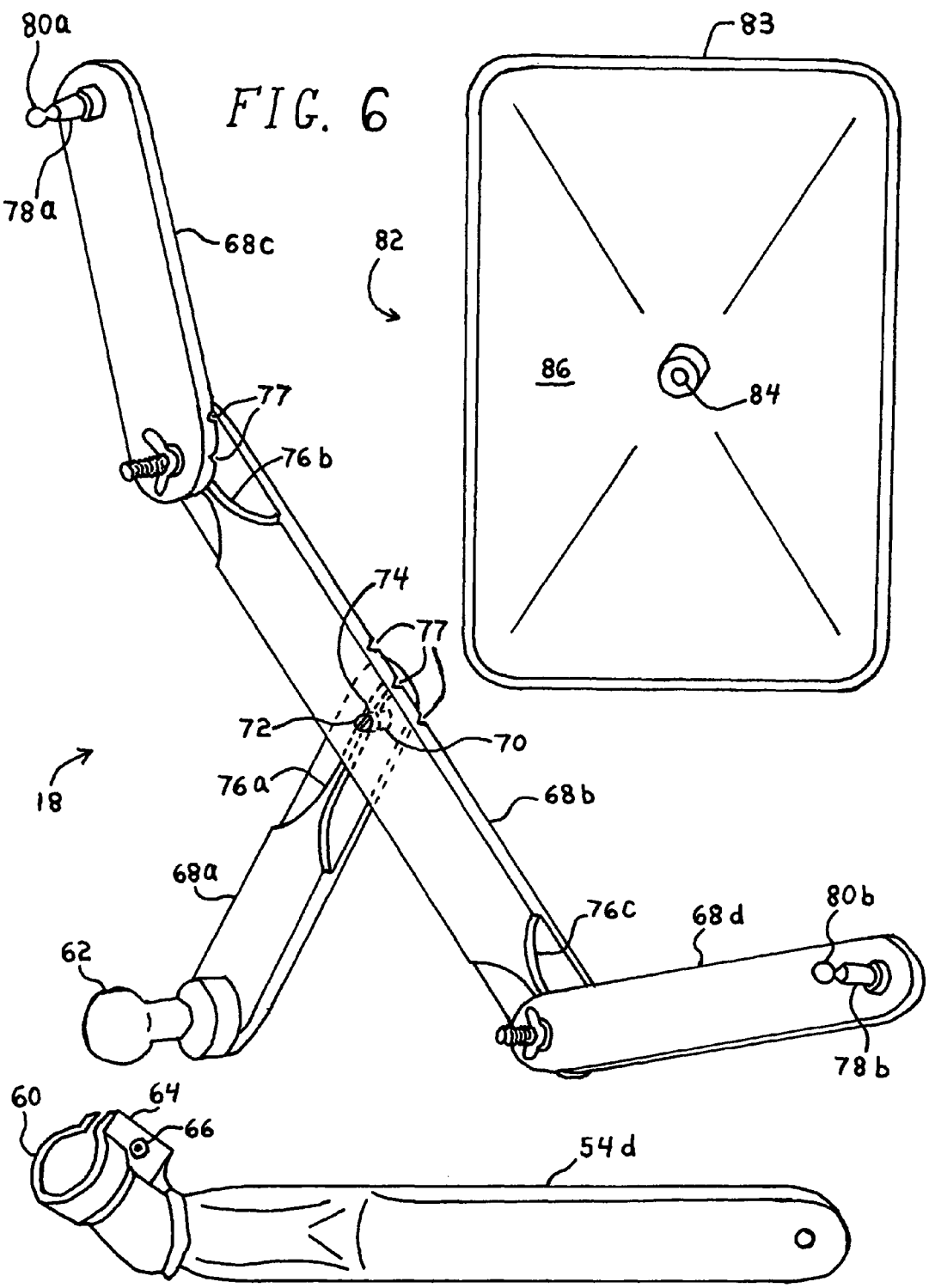

DUAL VIEW MIRROR SYSTEM

TECHNICAL FIELD

The present disclosure relates to a mirror system and, more particularly, to a dual view mirror system.

BACKGROUND

Hunting is an endeavor that tends to pit the survival adaptations of game animals against the skill of a hunter. Many game animals, for example the eastern white tail deer, have particularly acute senses that enable them to readily evade hunters. In addition, deer can move silently among trees and vegetation, and have an uncanny way of blending in with their environment.

Hunters employ a range of skills and techniques to increase the probability of a successful hunt. A skilled hunter often wears clothing and carries gear that is camouflaged to blend in with the environment. The skilled hunter also must be adept at remaining silent and near motionless while waiting for game to move within range of the weapon of choice. Unfortunately, the necessity for remaining as motionless as possible may tend to limit the hunter's field of view. If the hunter turns his or her head to increase the field of view, animals such as deer may be warned by the movement and not venture within range of the hunter's weapon. However, if the hunter remains motionless, thus limiting his field of view, he may be completely unaware of an animal that is somewhat to his rear yet within range. Accordingly, it would be advantageous for a hunter to readily and reliably increase his field of view without movement.

A hunting mirror is disclosed in U.S. Published Patent Application No. 2004/0125477, published in the name of Carter on Jul. 1, 2004 ("the Carter publication"). The Carter publication discloses an adjustable mirror device that includes a curved mount bracket fastened to an object via an adjustable strap. The adjustable mirror device includes a flexible "gooseneck" coupling extending between the curved mount bracket and a mirror. The flexible coupling includes a number of detachable coupling digits that include mating digit cups and digit balls.

While the hunting mirror disclosed in the Carter publication may offer a hunter an increased field of view, it may do so only to a limited extent. For example, the device of the Carter publication is configured to include only a single mirror, limiting any view to the hunter's rear to a single area at any given adjustment of the device. In addition, the numerous detachable coupling digits of the flexible coupling include no provisions to mitigate the likelihood that individual coupling digits may become dislodged and lost during assembly in a rugged environment such as that in which hunting usually occurs. Further, the Carter publication does not adequately address the significant issues involved in compactly and conveniently transporting such a device into the field.

The disclosed dual view mirror system includes improvements in the existing technology.

SUMMARY

In one embodiment, apparatus for increasing a person's field of view is disclosed. The apparatus may include a mounting base. A receiver may be rotatably mounted to the mounting base. A center arm section including a plurality of rigid segments may be adjustably mounted at one end to the receiver. The apparatus also may include an upper arm section. A ball and socket connection may be included between the upper arm section and the center arm section. The apparatus also may include a plurality of mirrors mounted on the upper arm section.

In another embodiment, a kit is disclosed. The kit may include a flexible container, including a first, larger compartment and a second, smaller compartment. The kit also may include components of a dual view hunting mirror received within the larger compartment. The components may include a mounting base, a center arm section including a plurality of rigid segments, an upper arm section, and a ball and socket connection configured to connect the upper arm section and the center arm section. The kit also may include a plurality of mirrors received in the smaller compartment.

In another embodiment, a dual view hunting mirror is disclosed. The dual view hunting mirror may include a mounting base including at least one mounting strap configured to secure the mounting base to a surface. The dual view hunting mirror also may include a receiver rotatably mounted to the mounting base. A first plurality of pivotally adjustable rigid segments may form a center arm section, and one of the rigid segments may be adjustably mounted to the receiver. An upper arm section may be adjustably mounted to another one of the rigid segments, and the upper arm section may include a second plurality of rigid segments. The dual view hunting mirror also may include at least two mirrors. One of the mirrors may be pivotally secured to a first segment of the second plurality of rigid segments. The other mirror may be pivotally secured to a second segment of the second plurality of rigid segments.

BRIEF DESCRIPTION OF THE DRAWINGS

FIG. 1 illustrates components of a dual view mirror system according to a disclosed embodiment;

FIG. 2 illustrates a disclosed embodiment of the dual view mirror system assembled and mounted adjacent a tree stand;

FIG. 3 illustrates flexible securing devices according to a disclosed embodiment;

FIG. 4 illustrates an assembled dual view mirror system according to a disclosed embodiment mounted on the ground;

FIG. 4a is an exploded view of certain components of the disclosed dual view mirror system;

FIG. 4b is a view of a connection in the dual view mirror system;

FIG. 6 illustrates components of a dual view mirror system according to a disclosed embodiment;

DETAILED DESCRIPTION

Figure 5:
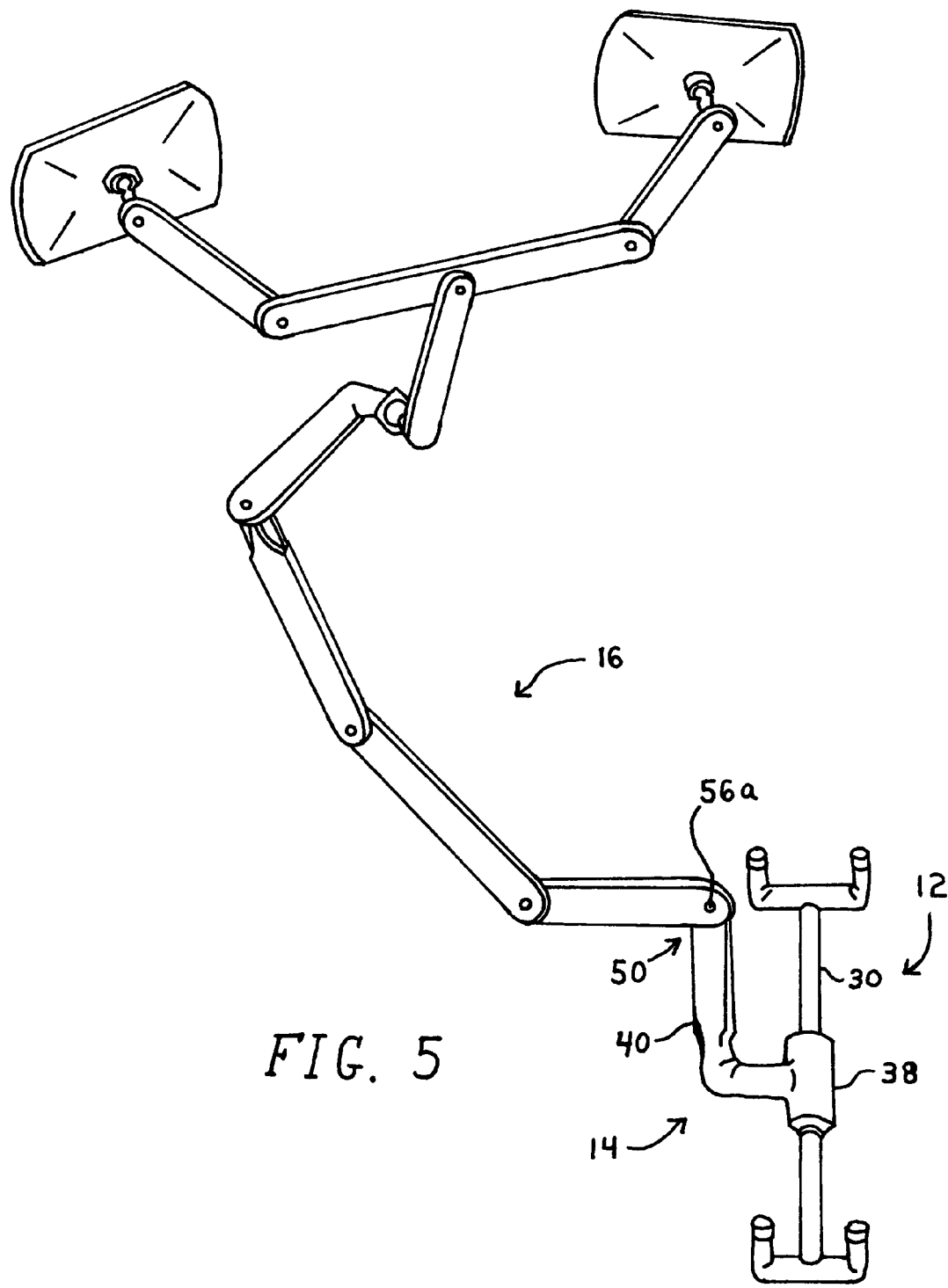
FIG. 5 is a view of a dual view mirror system according to the disclosure.

An exemplary embodiment of a dual view mirror system 10 is diagrammatically illustrated in FIG. 1, for example.

Components of mirror system 10 may include, among other things, a mounting base 12, a receiver 14, a center arm section 16, and an upper arm section 18. Receiver 14 may be rotatably connected to mounting base 12. Center arm section 16 may be adjustably connected to receiver 14. Upper arm section 18 may be connected to center arm section 16 via a ball and socket connection 20 between upper arm section 18 and center arm section 16.

FIG. 2 diagrammatically illustrates an embodiment of dual view mirror system 10 for use in enhancing the view of a hunter, for example. As can be seen in FIG. 2, mounting base 12 may engage an object such as a tree 22, for example. Mounting base 12 may be held securely against the surface of tree 22 via one or more flexible securing devices 24. Flexible securing devices 24 may include straps, belts, or bands, for example. Each flexible securing device 24 may include a suitable camouflage pattern on all or a portion of its surface.

Referring to FIG. 3, for example, a flexible securing device 24 may include a strap portion 26 and a buckle 28. Strap portion 26 may include a suitable pattern of hook and loop fastener material, such as that sold under the trademark VEL-CRO. In one embodiment, substantially the entire outer surface of strap portion 26 may include hook and loop fastener material, for example a one-piece design with hooks and loops combined. Accordingly, strap portion 26 may be placed about tree 22 and mounting base 12, passed through buckle 28, and secured in place via the hook and loop fastener material. It will be understood that instead of hook and loop fastener material, various other conventional fasteners employed for securing belts, straps, or bands may be used.

Referring to FIGS. 1 and 4, mounting base 12 may include a shaft member 30. Each end of shaft member 30 may include a suitable cross member 32, and each cross member may include a pair of projections 34. Accordingly, mounting base 12 may be in the form of a shaft member 30 with four spaced projections 34. The four spaced projections may engage a suitable object, such as the tree 22 illustrated in FIG. 2. In order to prevent damage to tree 22 and/or to enhance frictional engagement against an object by projections 34, each projection 34 may include an end member 36, such as a cap, formed of a suitable material such as rubber, plastic, etc. In order to permit mounting base 12 to suitably adapt to a relatively uneven surface such as that which may occur on a tree, shaft member 30 may be configured to permit one end of shaft member 30 to be rotated relative to the other end.

Receiver 14 may be rotatably mounted relative to mounting base 12. For example, as may be seen by reference to FIG. 5, receiver 14 may include a cylindrical portion 38 and an adjoining portion 40. Cylindrical portion 38 may be mounted to shaft member 30 of mounting base 12 via one or more bearings 42, not illustrated in FIG. 5, but seen in FIG. 10 to be described below. Adjoining portion 40 may be secured to cylindrical portion 38, for example integrally formed with cylindrical portion 38, and may extend outwardly from cylindrical portion 38. For example, as illustrated in FIG. 5, and as can be seen in FIGS. 1 and 4, adjoining portion 40 may be somewhat L-shaped with a portion extending outwardly from cylindrical portion 38 and a portion extending relatively parallel to cylindrical portion 38. An outward end 50 of adjoining portion 40 may include structure suitable for attachment of center arm section 16.

Center arm section 16 may include a plurality of rigid segments. For example, as diagrammatically illustrated in FIGS. 1 and 4, center arm section 16 may include four rigid segments 54a, 54b, 54c, and 54d. It will be understood that embodiments with less than four and greater than four rigid segments are contemplated. In the embodiment illustrated in FIG. 1, segment 54a may be connected to receiver 14, segment 54b may be connected to segment 54a, segment 54c may be connected to segment 54b, and segment 54d may be connected to segment 54c. Each of the connections between the several segments 54a-54d may be similarly formed.

Figure 10:
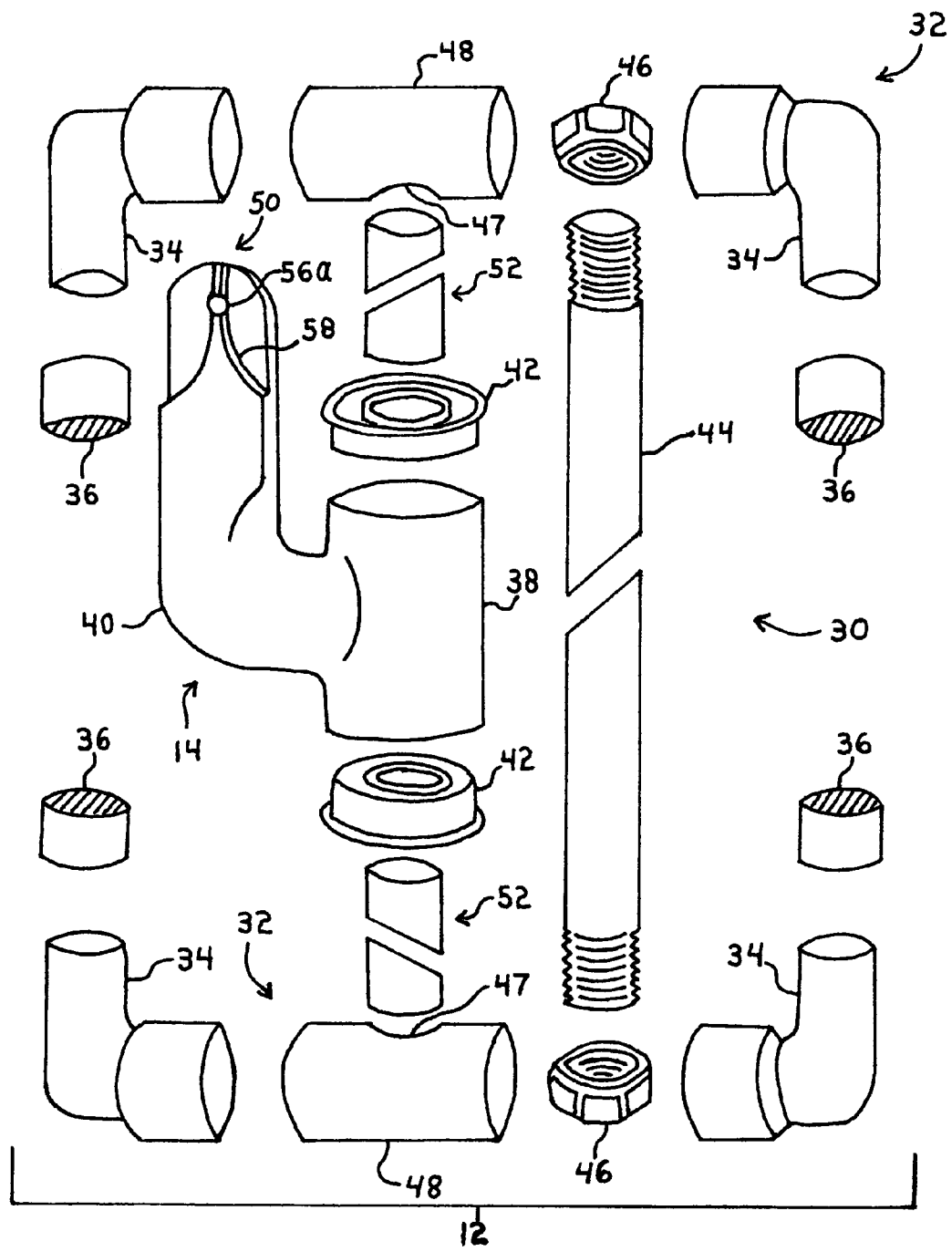
FIG. 10 is an exploded view of certain components of a dual view mirror system according to a disclosed embodiment.

Referring to FIG. 10, for example, outward end 50 of adjoining portion 40 of receiver 14 may include an aperture 56a and a raised portion 58 centered across the aperture on one side of outward end 50. Referring to FIG. 4a, for example, an end, portion 51 of segment 54a configured to be connected to receiver 14 is illustrated. End portion 51 may include an aperture 56b and a plurality of grooves 59 extending radially from the aperture 56b. In assembly, raised portion 58 of outward end 50 of adjoining portion 40 mates with one of grooves 59 of end portion 51 of segment 54a.

Referring to both of FIGS. 4a and 4b, for example, a suitable fastener, for example a bolt 57 and associated wing nut 61, may be secured through the aperture 56a and the aperture 56b. By loosening wing nut 61 relative to bolt 57, the raised portion 58 of adjoining portion 40 may be aligned with a suitable groove 59 of segment 54a, and segment 54a may be aligned at an adjusted position relative to adjoining portion 40 of receiver 14. The threaded end of bolt 57 may include structure 63 configured to prevent the wing nut 61 from being completely removed from the bolt 57 once the bolt 57 and wing nut 61 are assembled. For example, after initial assembly of segment 54a to adjoining portion 40, the end of the threaded portion of bolt 57 may be crimped to deform the threads. Other structure configured to prevent complete removal of the wing nut 61 is contemplated. For example, the bolt 57 may include an aperture receiving a cotter pin (not illustrated).

It will be appreciated that each of the connections between the several segments 54a-54d may be similarly formed with mating apertures and a raised portion 58 centered across the aperture of one of the segments and cooperating with one of a plurality of grooves 59 extending radially from the aperture of the other segment. Accordingly, as can be appreciated from viewing FIG. 1, for example, each of segments 54a-54d may be relatively adjusted to a number of different configurations relative to receiver 14. As can further be appreciated from viewing FIG. 4b, for example, a given segment may include a raised portion 58 on one side of the segment at one end, and a plurality of grooves 59 on the opposite side of the segment at the other end. In some embodiments each of the several segments 54a-54d may be of a length different from the length of the remaining segments.

In the example illustrated in FIG. 1, segment 54d may be suitably adapted for connection to upper arm section 18. For example, referring more particularly to FIG. 6, segment 54d of center arm section 16 may include a socket 60 configured to cooperate with a ball 62 associated with upper arm section 18. Socket 60 may include a suitable adjustable clamping mechanism 64 whereby ball 62 may be inserted or removed from socket 60. Clamping mechanism 64 may be tightened or loosened via a suitable fastener 66, for example. Fastener 66 may be selected from among various fasteners, such as a bolt and wing nut combination. Other types of conventional fasteners are contemplated. In some embodiments, the connection between ball 62 and socket 60 may be a snap-fit connection.

Upper arm section 18 may include a number of rigid segments, including, for example, rigid segments 68a, 68b, 68c, and 68d. Referring still to FIG. 6, segment 68a may have a length greater than its width or thickness, may include ball 62 at one of its ends, and may include an aperture 70 located at its opposite end. Segment 68a may be connected to segment 68b generally centrally of segment 68b via a suitable fastener 72 cooperating with aperture 70 and a centrally located aperture 74 in segment 68b. Segments 68c and 68d each may be connected at an end thereof to opposite ends of segment 68b via apertures and suitable fasteners. Each of the fasteners connecting segments 68a-68d may include bolts and wing nuts similar to those included for the connections between segments 54a-54d of center arm section 16 described above. The connection between segment 68a and segment 68b, and each of the connections between segment 68b and segments 68c and 68d, may include a projection 76a, 76b, 76c on one segment, and a plurality of grooves 77 extending radially from one of the apertures on the cooperating segment, all as illustrated in FIG. 6, for example.

Referring still to FIG. 6, each of segments 68c and 68d may be configured to adjustably receive a mirror 82. For example, while one end of each of segments 68c and 68d may be connected to segment 68b as described, an opposite end of each of segments 68c and 68d may include a projecting post 78a, 78b, terminating respectively in a ball 80a, 80b. A rearward view of one of mirrors 82 is illustrated in FIG. 6. Mirror 82 may be adjustably connected to ball 80a via a suitable socket 84 on a rearward side 86 of mirror frame 83. A similar mirror 82 may be adjustably connected to ball 80b. Each ball 80a, 80b may be configured relative to mirror socket 84 for a snap fit connection.

Figure 9:
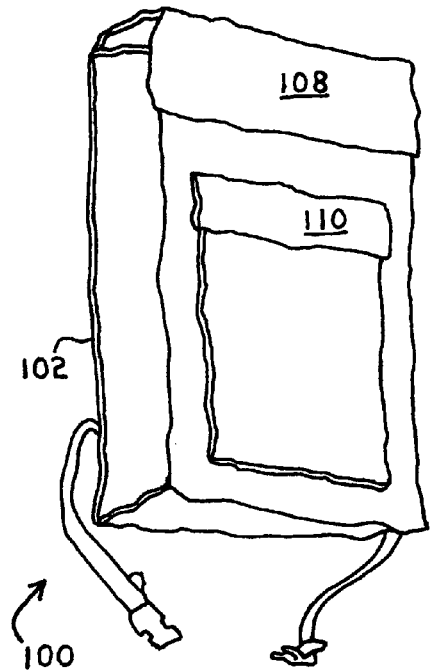
FIG. 9 illustrates another view of a flexible container according to a disclosed embodiment.
Figure 8:
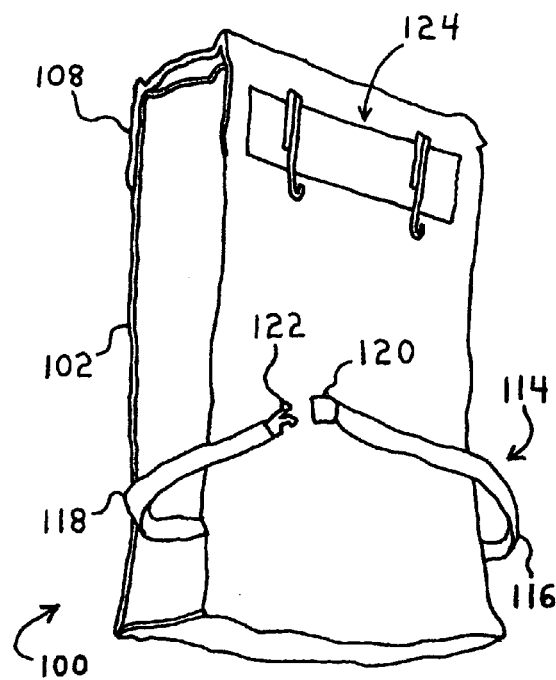
FIG. 8 illustrates a flexible container according to a disclosed embodiment.
Figure 7:
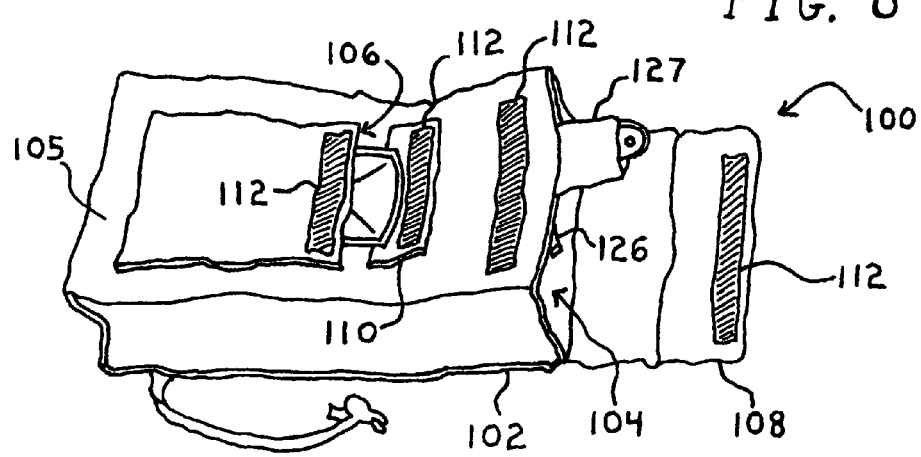
FIG. 7 illustrates a kit according to a disclosed embodiment.

FIGS. 7-9 illustrate one embodiment of a kit 100 that may be employed for compactly associating the various components of the disclosed dual view mirror system 10 for storage or transportation, for example. Kit 100 may include a suitable flexible container 102 sized and shaped to contain all components of the dual view mirror system 10, and configured to be conveniently transported by a person, such as a hunter. Flexible container 102 may be formed from various materials, such as a suitable fabric or a suitable plastic material. For example, flexible container 102 may be formed from one or more pieces of canvas or other abrasion and tear resistant fabric. Flexible container 102 may be suitably treated to be water resistant and/or water repellant, and may be suitably camouflaged so as to blend in with a particular outdoor environment, such as a wooded environment.

Referring still to FIGS. 7-9, flexible container 102 may include a first, larger compartment 104, and a second, smaller compartment 106. Larger compartment 104 may be suitably sized and shaped to receive mounting base 12, receiver 14, center arm section 16, and upper arm section 18, for example. Smaller compartment 106 may be suitably sized and shaped to receive a pair of mirrors 82. In one embodiment, smaller compartment 106 may be formed on an outer surface 105 of larger compartment 104. Each of larger and smaller compartments 104, 106 may include a suitable flap 108, 110, respectively, for covering and uncovering an opening to each compartment. Each flap 108, 110 may be secured in a closed position via any suitable fastener. In one embodiment, the fastener may include suitable strips or patches of hook and loop fastener material 112, such as, for example, that sold under the trademark VELCRO.

The inner portion of larger compartment 104 may include a divider 126. Divider 126 may enable upper arm section 18 to be separated from center arm section 16 and other components of the dual view mirror system 10. Upper arm section 18 may be stored in larger compartment 104 on one side of divider 126 with the various segments in a folded condition with each segment substantially parallel to and adjacent the other segments. Center arm section 16 also may be stored in larger compartment 104 on the other side of divider 126 with the various segments in a folded condition with each segment substantially parallel to and adjacent the other segments. Center arm section 16 may be stored assembled to receiver 14 and mounting base 12. Any of the components stored in larger compartment 104 also may separately be packaged and stored in a suitable bag or pouch, such as pouch 127 illustrated in FIG. 7.

Flexible container 102 may include a strap mechanism 114. Strap mechanism 114 may include, for example, a first strap element 116 and a second strap element 118. Strap elements 116 and 118 may be suitably secured to a surface of flexible container 102 and may be detachably fastened to each other via any suitable fastening device. For example, strap elements 116, 118 may be detachably fastened to each other via mating buckle elements 120 and 122, for example snap-fit buckle elements. Alternatively, strap elements 116 and 118 may be secured to each other via suitable hook and loop fastening material or any other suitable fastener. It is contemplated that strap elements 116, 118 may be formed from a suitable elastic fabric.

A belt clip 124 also may be included on flexible container 102, for example on a rear outer surface thereof. Belt clip 124 may be secured adjacent an upper portion of a surface of flexible container 102, and strap mechanism 114 may be secured adjacent a lower portion of a surface of flexible container 102. Instead of belt clip 124, flexible container 102 may include a waist belt with a suitable buckle mechanism or with hook and loop fasteners, for example. Alternatively, flexible container 102 may include a suitable belt loop for attachment to a belt worn by a user.

FIG. 10 is an exploded view diagrammatically illustrating aspects of an embodiment of mounting base 12 and receiver 14 in more detail. Shaft member 30 may include a rod member 44 threaded on each end. Each end of rod member 44 may extend through an aperture 47 in a sleeve 48 of cross member 32 and may include a nut 46 suitably captured within sleeve 48. Cylindrical member 38 of receiver 14 may be centered over rod member 44, and bearings 42 may be mounted on rod member 44 and positioned along rod member 44 so as to engage the ends of cylindrical member 38. The space between nuts 46 and bearings 42 along rod member 44 may include appropriately sized spacers 52 bearing at one end against a nut 46 and at the other end against a bearing 42. Cross members 32 and projections 34 may be assembled from separate components as illustrated in FIG. 10. In assembly, the separate components may be joined by press fitting, gluing, soldering, set screws, or by any other conventional joining expedient.

Practical Applicability

The disclosed embodiments of a dual view mirror system may be useful in any situation where it may be advantageous to increase a field of view. For example, hunters may employ the disclosed dual view mirror system to increase the probability of success in the hunting endeavor. With the disclosed dual view mirror system, a hunter may selectively view two different areas in addition to the hunter's front field of view without turning his head to spot approaching game. The disclosed dual view mirror system may be assembled rapidly in the field and adjusted to provide the desired view without the use of tools and without the risk of loosing parts. The disclosed kit may enable the dual view mirror system to be readily stored and to be readily and conveniently transported into and from the field.

One example of the use and operation of the disclosed kit 100 and dual view mirror system 10 may be understood from the following description and by reference to the drawings. Dual view mirror system 10 may be stored as kit 100 until the user desires to avail himself or herself of its benefits, for example in the field during hunting. Referring to FIG. 8, for example, flexible container 102 may be clipped to a belt worn by the user via belt clip 124, and secured to the user's leg via the strap elements 116, 118, and the buckle elements 120, 122 of strap mechanism 114. Thus, kit 100 may be held in place against the user's leg by strap mechanism 114 while the hunter is maneuvering in the field or climbing.

Figure 12:
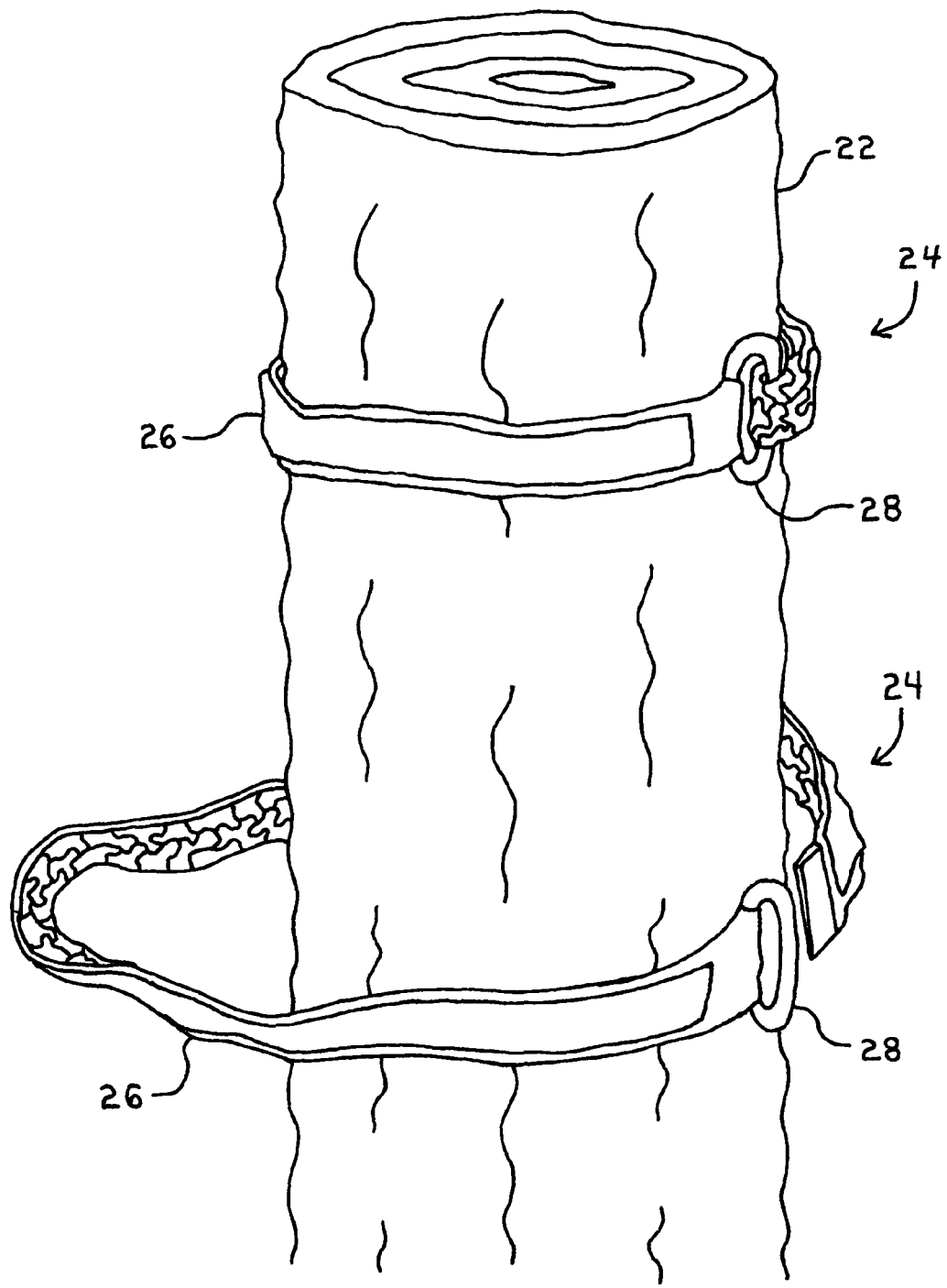
FIG. 12 illustrates mounting of flexible securing devices on a tree.

Once in the field, a hunter may move to a location where game may be known to pass by or browse, all in a manner well known to hunters. Referring to FIG. 2, for example, the hunter may ascend a tree 22 and may station himself in a tree stand. Flap 108 of flexible container 102 may be moved to an open position to allow access to components of the dual view mirror system 10. Two flexible securing devices 24 may be removed from flexible container 102. Referring also to FIG. 12, for example, for each flexible securing device 24, strap portion 26 may be passed around tree 22, and strap portion 26 may be passed through buckle 28 and pressed back upon itself to engage hook and loop fastening material and rather loosely secure the flexible securing devices in place.

Subsequently, center arm section 16, receiver 14, and mounting base 12 may be removed from flexible container 102. Center arm section 16, receiver 14, and mounting base 12 may be stored in flexible container 102 in an assembled but collapsed condition. In other words, wing nuts 61 may be loose relative to bolts 57, and each of segments 54a-54d may be folded relatively about bolts 57 such that segments 54a-54d are substantially parallel to one another and laterally adjacent one another. Embodiments wherein the several segments 54a-54d are of differing relative lengths may enable the segments to be folded without interference by the bolts 57 and wing nuts 61. Embodiments wherein the threaded ends of bolts 57 include structure 63 to prevent complete removal of the wing nuts 61 effectively eliminate risk that a wing nut 61 may be dropped and lost in the field.

Once center arm section 16 with receiver 14 and mounting base 12 are removed from flexible container 102, shaft member 30 of mounting base 12 may be manipulated along with loosely secured flexible securing devices 24 so as to position projections 34 with associated end members 36 against the surface of tree 22. To accommodate irregularities in the surface of tree 22, for example, cross member 32 at one end of shaft member 30 may be slightly rotated relative to shaft member 30 and relative to the cross member 32 at the other end of shaft member 30. This slight rotation is permitted in view of the threaded engagement of nuts 46 with rod member 44. Each flexible securing device 24 may then be adjusted by repositioning strap portions 26 relative to buckles 28 to ensure that mounting base 12 is in secure engagement with tree 22 and held against any substantial movement by flexible securing devices 24. End members 36 on projections 34 of mounting base 12 ensure against damage to tree 22.

The use of flexible securing devices 24 enables securing mounting base 12 in place without any need for tools. Flexible securing devices 24 also enable the dual view mirror system to be secured to trees of varying circumference. In some embodiments, flexible securing devices 24, instead of being separate components, may be suitably fastened to mounting base 12. For example, buckles 28 and/or strap portions 26 may be riveted, screwed, or otherwise fastened to mounting base 12. In such a situation, mounting base 12 may be held in place with one hand while the other hand is used to wrap a strap portion 26 around tree 22, pass it through a buckle 28, and secure it in place via the hook and loop fastener material on the strap portion 26.

Once center arm section 16, receiver 14, and mounting base 12 are substantially secured, upper arm section 18 may be removed from flexible container 102. Ball 62 of upper arm section 18 may be inserted into socket 60 of center arm section 16 and clamping mechanism 64 may be adjusted via fastener 66 to securely capture ball 62 within socket 60. Subsequently, mirrors 82 may be removed from smaller compartment 106 and secured to upper arm section 18 via snap-fit of balls 80a, 80b with a socket 84 of a mirror 82. The hunter may then adjust the various segments of center arm section 16 and upper arm section 18 and all the various connections of the dual view mirror system 10 to achieve the desired enhancement of the hunter's field of view. The various segments of center arm section 16 and upper arm section 18 may be secured in the desired adjusted position via wing nuts 61. Individual adjustment of the view in mirrors 82 may be achieved by moving mirrors 82 relative to upper arm section 18 via ball and socket connections 80a, 84 of one mirror, and 80b, 84 of the other mirror.

Figure 11:
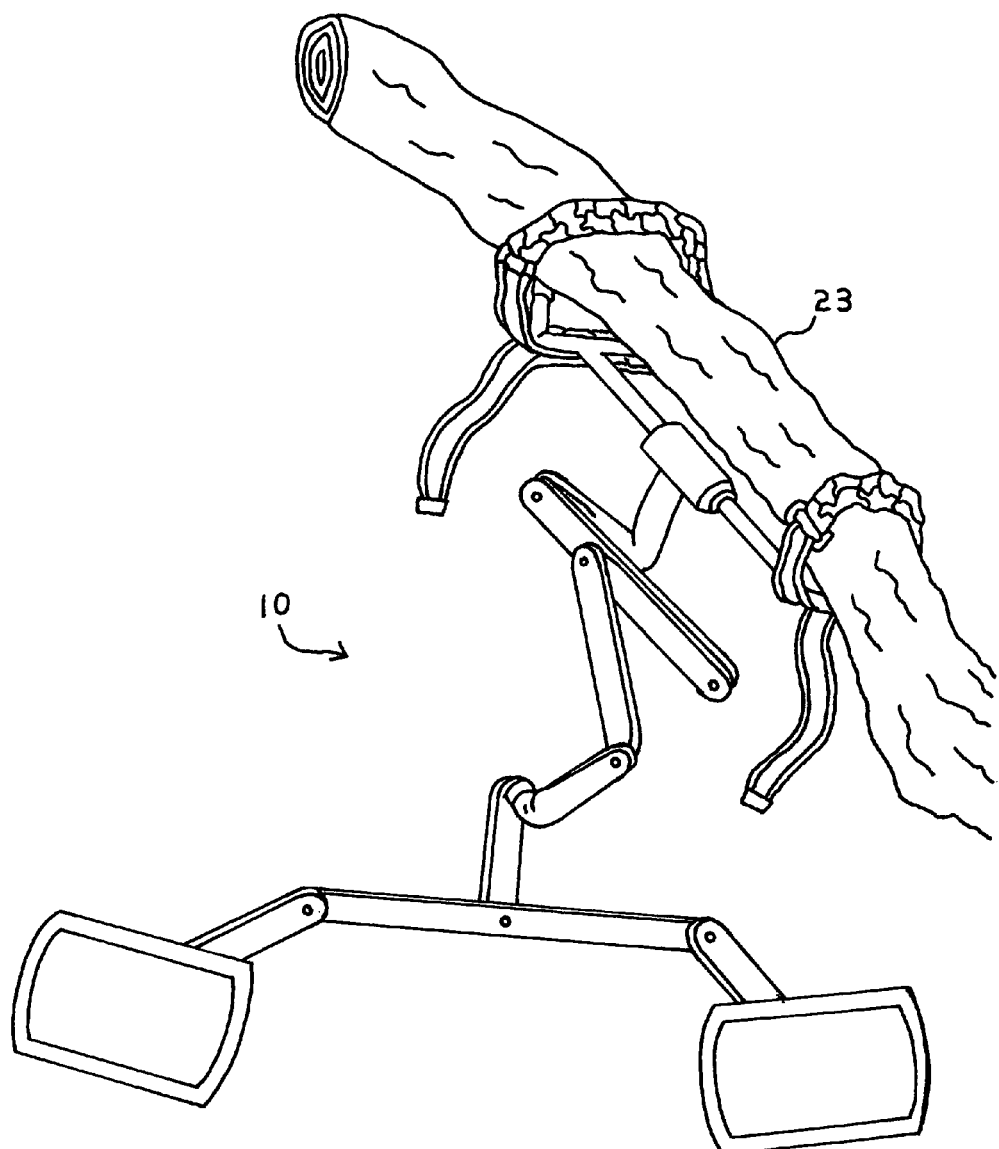
FIG. 11 illustrates an assembled dual view mirror system according to a disclosed embodiment mounted on a tree limb.

Referring to FIG. 11, in some situations it may be more convenient and/or advantageous to secure the dual view mirror system 10 to a tree limb 23. Such a situation may occur where a hunter is stationed on the ground near low hanging tree limbs, or where a hunter is stationed in a tree adjacent a tree limb. Although not illustrated, it will be understood that dual view mirror system 10 also may be secured to a post or other object. Additionally, it will be understood that dual view mirror system 10 may be mounted on the ground 25 or other relatively flat surface as generally illustrated in FIG. 4, for example.

The relationship of threaded member 44, nuts 46, spacers 52, bearings 42, and receiver 14 facilitates rotation of receiver 14 relative to mounting base 12, and facilitates the prevention of rotation of receiver 14 relative to mounting base 12 when desired. For example, where dual view mirror system 10 is to be mounted with shaft member 30 more or less horizontally, such as when it is mounted on the ground 25 (FIG. 4), a set position of receiver 14 may be fixed from rotation relative to mounting base 12 by a slight rotation of one of cross members 32 relative to the other of cross members 32. This motion tends to tighten one or the other of nuts 46 against an adjacent spacer 52 (FIG. 10), which in turn places pressure against a bearing 42 and against cylindrical portion 38 of receiver 14.

The various segments of center arm section 16 and upper arm section 18 each may be a planar member having a length greater than its width and formed from any suitable rigid material. For example, the segments could be made from suitably sized steel or aluminum bar stock. Other metals are contemplated. Alternatively, the segments could be formed, for example molded, from any suitable polymer such as high density polyethylene. Other components, such as receiver 14 and mounting base 16, also could be made from a suitable metal or plastic material. It also is contemplated that some components could be plastic and other components could be metal. For example, fasteners such as bolts and wing nuts could be metal and other components could be plastic.

While embodiments have been disclosed in connection with enhancing the field of view of a hunter, it should be apparent that disclosed embodiments also may be used for other purposes. For example, the disclosed embodiments also may enhance the field of view of a nature photographer, increasing the probability of unique photographs. As another example, the disclosed embodiments also may enhance the field of view of scientists involved in the observation and study of wildlife and/or natural phenomena. As yet another example, the disclosed embodiments also may be useful in military combat scenarios, for example during training in wooded environments or in actual combat, to enhance the field of view of combat personnel. Other uses for the disclosed embodiments may readily occur to those skilled in the art.

It will be apparent to those having ordinary skill in the art that various modifications and variations can be made to the disclosed dual view mirror system without departing from the scope of the disclosure. For example, fasteners for the flexible securing devices, strap mechanism, and flaps may include known expedients other than hook and loop fasteners, such as buckles, snaps, etc. As another example, while bolts and wing nuts have been disclosed in connection with the segments of center and upper arm sections, it will be apparent that numerous other types of conventional fasteners could be employed. As an additional example, the number of rigid segments in either or both of center arm section and upper arm section may vary. For example, center arm section may include three, four, five, or more segments, and upper arm section may include more or less segments than illustrated.

While exemplary embodiments have been disclosed, other embodiments will be apparent to those having ordinary skill in the art from consideration of the specification and practice of the disclosed embodiments. It is intended that the specification and examples be considered as exemplary only with the true scope of protection being indicated by the following claims.

I claim:

1. Apparatus for increasing a person's field of view, comprising:
    a mounting base;
    a receiver rotatably mounted to the mounting base;
    a center arm section including a plurality of rigid segments and adjustably mounted at one end to the receiver;
    an upper arm section;
    a ball and socket connection between the upper arm section and the center arm section; and
    a plurality of mirrors mounted on the upper arm section;
    wherein at least some of the segments of the plurality of rigid segments include an aperture at each end of the segment, a plurality of grooves extending radially from the aperture at one end of the segment, and a raised portion centered across the aperture at the other end of the segment.

2. The apparatus of claim 1, wherein the mounting base includes a shaft member about which the receiver is rotatably mounted, at least one strap member configured to secure the mounting base to an object, and a plurality of projections extending from the shaft member and configured to engage the object.

3. The apparatus of claim 1, wherein each segment is adjustably mounted to an adjacent segment by a threaded member extending through the apertures of the segments and engaging a cooperating wing nut, wherein the end of the threaded member includes structure to prevent the wing nut from being completely removed from the threaded member, and wherein each segment is of a length different from the length of the remaining segments.

4. The apparatus of claim 1, wherein the upper arm section includes a segment receiving the ball and socket connection at one end, and wherein the segment is adjustably mounted at its second end generally centrally of a second segment.

5. The apparatus of claim 4, further including the plurality of mirrors adjustably mounted to the second segment.

6. The apparatus of claim 5, including third and fourth segments adjustably mounted at each respective end of the second segment, and wherein the plurality of mirrors includes a mirror adjustably mounted to the respective third and fourth segments via a ball and socket connection.

7. A dual view hunting mirror, comprising:
    a mounting base including at least one mounting strap configured to secure the mounting base to a surface;
    a receiver rotatably mounted to the mounting base;
    a first plurality of pivotally adjustable rigid segments forming a center arm section, one of the rigid segments adjustably mounted to the receiver;
    an upper arm section adjustably mounted to another one of the rigid segments, the upper arm section including a second plurality of rigid segments;
    at least two mirrors, one of the mirrors pivotally secured to one segment of the second plurality of rigid segments, and the other mirror pivotally secured to another segment of the second plurality of rigid segments;
    wherein at least some of the segments of the first plurality of rigid segments include an aperture at each end of the segment, a plurality of grooves extending radially from the aperture at one end of the segment, and a raised portion centered across the aperture at the other end of the segment.

8. The dual view hunting mirror of claim 7, wherein each segment of the first plurality of segments is a planar member including a length greater than its width, and wherein the plurality of grooves at one end of the segment is on one side of the planar member, and the raised portion at the other end of the segment is on an opposite side of the planar member.

9. The dual view hunting mirror of claim 8, wherein each segment of the first plurality of segments is of a length different from the length of the remaining segments and wherein each segment is adjustably mounted to an adjacent segment by a threaded member extending through the apertures and engaging a cooperating wing nut, wherein the end of the threaded member includes structure to prevent the wing nut from being completely removed from the threaded member.

10. The dual view hunting mirror of claim 7, wherein the upper arm section includes a first rigid segment adjustably mounted to one of the rigid segments of the center arm section via a ball and socket connection.

11. A dual view hunting mirror, comprising:
    a mounting base including at least one mounting strap configured to secure the mounting base to a surface;
    a receiver rotatably mounted to the mounting base;
    a first plurality of pivotally adjustable rigid segments forming a center arm section, one of the rigid segments adjustably mounted to the receiver;
    an upper arm section adjustably mounted to another one of the rigid segments, the upper arm section including a second plurality of rigid segments;
    at least two mirrors, one of the mirrors pivotally secured to one segment of the second plurality of rigid segments, and the other mirror pivotally secured to another segment of the second plurality of rigid segments;
    wherein the upper arm section is adjustably mounted to the center arm section via a first rigid segment of the upper arm section, and further including a second rigid segment adjustably mounted centrally thereof to the first rigid segment, a third rigid segment adjustably mounted to a first end of the second rigid segment, and a fourth rigid segment adjustably mounted to a second end of the second rigid segment.

12. The dual view hunting mirror of claim 11, further including a first mirror frame adjustably connected to the third rigid segment and a second mirror frame adjustably connected to the fourth rigid segment.

13. The dual view hunting mirror of claim 11, wherein at least some of the rigid segments of both the center arm section and the upper arm section include apertures with a plurality of radially extending grooves surrounding some of the apertures, and at least one raised portion adjacent others of the apertures, further including a threaded member and wing nut adjustably securing adjacent rigid segments, and wherein the rigid segments of the center arm section are of differing lengths, one relative to the other, and wherein the rigid segments of the upper arm section are of differing lengths, one relative to the other.

* * * * *